March 3, 1959 W. H. NEFF 2,876,013
LAWN PLANTING MACHINE
Original Filed July 25, 1951 2 Sheets-Sheet 1
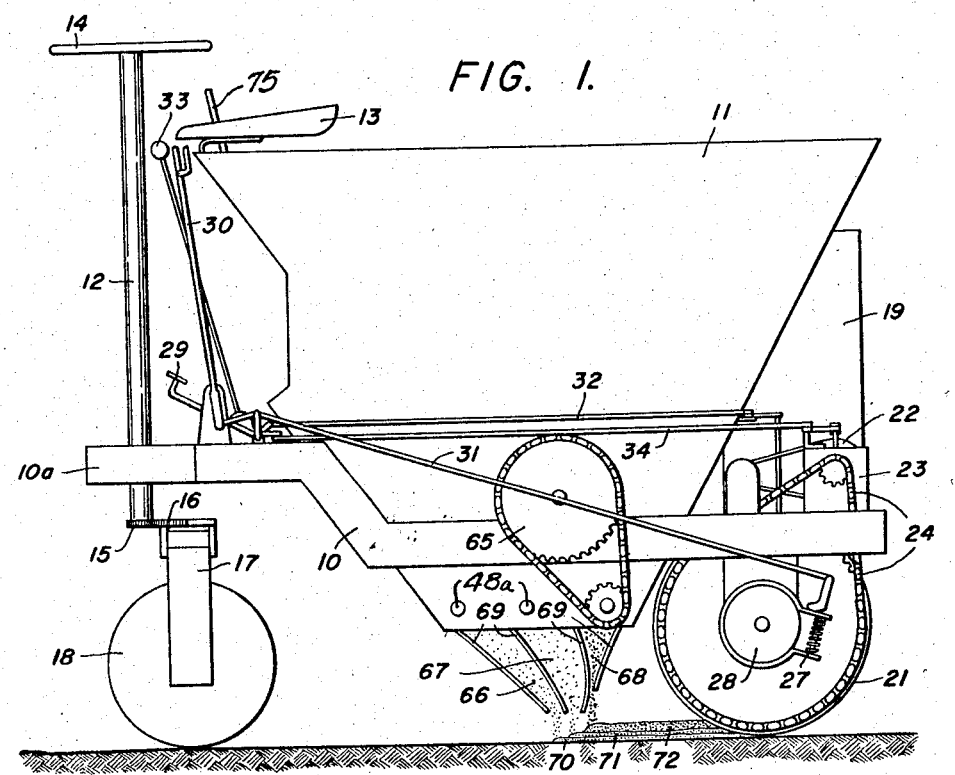
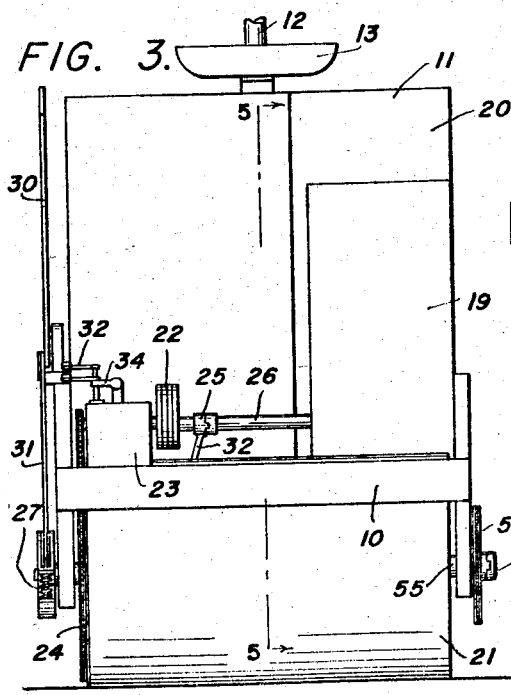
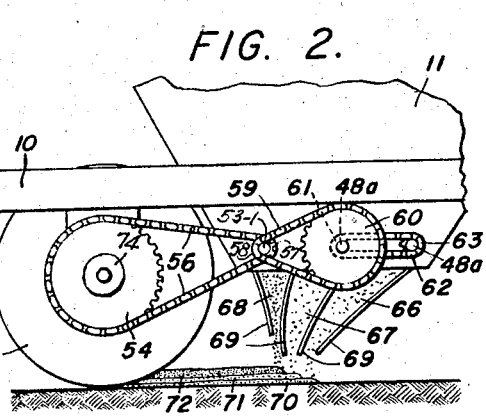
Inventor:
WILLIAM H. NEFF,
By
Attorneys.

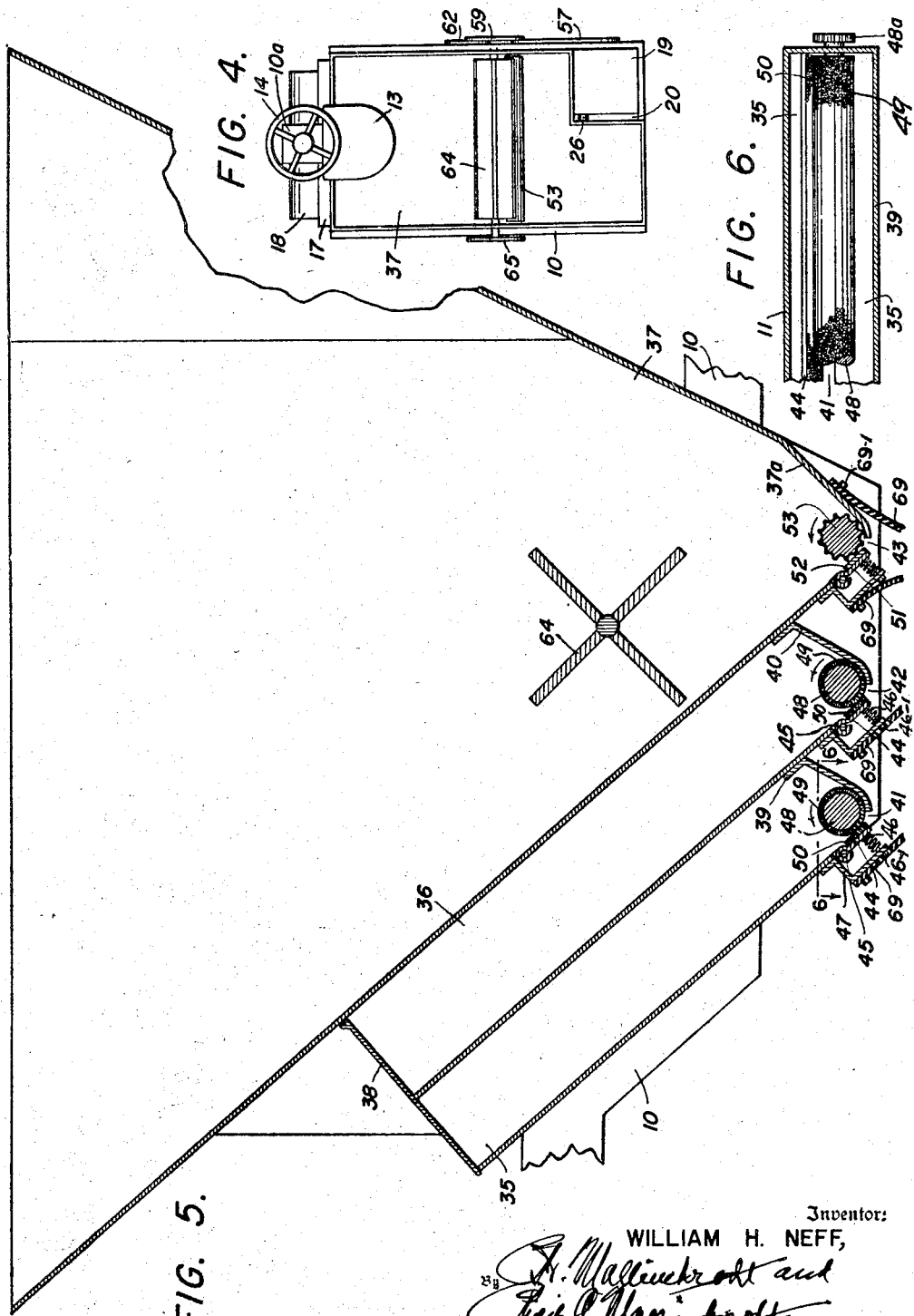

United States Patent Office 2,876,013
Patented Mar. 3, 1959

2,876,013

LAWN PLANTING MACHINE

William H. Neff, Salt Lake City, Utah

Original application July 25, 1951, Serial No. 238,419, now Patent No. 2,733,838, dated February 7, 1956. Divided and this application October 31, 1955, Serial No. 543,961

1 Claim. (Cl. 275—2)

This invention relates to power machines for planting lawns, and is concerned particularly with providing a machine which will distribute fertilizer, grass seed, and compost sequentially in desired relative proportions, and which will simultaneously compact the soil and applied materials.

The present application constitutes a division of my co-pending and presently allowed applications Serial No. 238,419, now Patent No. 2,733,838 issued February 7, 1956, which is, itself, a continuation in part of my allowed co-pending application S. N. 700,700, filed Oct. 2, 1946, and now forfeited.

A principal object of the invention is to provide for mechanically carrying out all the operations normal to the planting of new lawns, in a properly integrated manner which is subject to precise control and which is, therefore, far more accurate and economical than the usual manual method of lawn planting.

An object is to provide such a machine which shall be capable of complete operation and control by a single operator.

A further object is to insure substantially uniform mechanical dissemination of seed and of chemical fertilizer, especially, so as to attain proper relative proportions for optimum lawn coverage and growth, and so as to eliminate danger of chemical "burning" of the new grass, as well as waste of expensive seed and fertilizer.

In accomplishing these objects, I prefer to utilize a dispensing and distributing device forming the subject of my co-pending application for patent S. N. 149,237, filed March 13, 1950, entitled "Dispensing and Distributing Device for Finely Divided Materials," now U. S. Patent No. 2,643,798, issued June 30, 1953, together with an arrangement of hoppers and motivating means which effect the results sought.

The machine of the invention advantageously takes the form of a self-propelled vehicle provided with suitable operational controls, such as steering mechanism, brakes, motor, transmission, and clutch. Nevertheless, the machine may be constructed in the form of a trailer arranged to be hitched to a suitable power unit, such as a farm tractor.

An outstanding combinational feature of the invention is the provision of a front to rear extending series of hoppers for the materials to be applied during the lawn planting operation, inter-geared distributing mechanisms operably mounted longitudinally of the discharge openings of the respective hoppers, and separate discharge chutes leading downwardly from the respective distributing mechanisms, whereby the respective materials are individually distributed, and are deposited sequentially as distributed.

The distributing mechanisms associated with the hoppers intended to receive grass seed and chemical fertilizer, respectively, are unique in their combination of interacting elongate rollers and substantially stationary, elongate reaction members, both covered with a pile material, usually and preferably a carpet-like material. I have found that when a roller covered with such pile material rotates against a stationary reaction member covered with a similar material, a very uniform and highly satisfactory dissemination of either grass seed or dry chemical fertilizer is achieved.

Further objects and features of the invention will become apparent from the following detailed description of the particular preferred embodiment illustrated in the accompanying drawings.

In the drawings:

Fig. 1 represents an elevation of the left side of a self-propelled machine embodying the novel features of the invention, the machine being shown in the act of planting a lawn;

Fig. 2, a fragmentary elevation of the right side of the machine, showing drive gearing between the traction roller and the several material-distributing rollers;

Fig. 3, a rear elevation of the machine;

Fig. 4, a top plan view of the machine, drawn to a reduced scale and eliminating much of the drive and control mechanism;

Fig. 5, a longitudinal vertical section, taken on the line 5—5 of Fig. 3 and drawn to a considerably enlarged scale; and Fig. 6, a fragmentary horizontal section taken on the line 6—6 of Fig. 5.

Referring to the drawings: The machine as a whole is illustrated somewhat schematically in Figs. 1, 3, and 4. It comprises, in the illustrated form, a chassis framework 10, advantageously made up of structural steel members welded together, and a hopper structure 11 supported by and extending through and somewhat below such framework.

At the forward and narrowed end 10a of the chassis framework, a steering column 12 extends upwardly in convenient proximity to a seat 13 surmounting the hopper structure 11. A steering wheel 14 is fixed to the upper end of a shaft (not shown), which extends through and is journaled within the column 12, and a gear 15, fixed to the lower end of the shaft, meshes with a sector gear 16 fixed to the top of a forked mounting 17 for a front compaction roller 18. The roller 18, thus, serves to steer the machine under the control of a driver, who sits on the seat 13 and manipulates the steering wheel 14.

An engine 19 of any conventional type, preferably gasoline powered, is mounted on the chassis 10 within an external alcove 20 provided by suitably configurating the hopper structure 11, see Fig. 4, and serves to drive a rear tractor and compaction roller 21 through reduction pulleys and belting 22 and forward and reverse gears 23. A sprocket drive 24, Fig. 1, directly connects the output shaft of the gear box 23 with the rear roller 21, and a clutch 25 is interposed in the drive shaft 26, Fig. 3, between the engine and reduction gearing 22.

Brake mechanism 27, Fig. 1, is operably arranged with respect to a brake drum 28 secured to the rear roller 21, and is manually controlled by the driver by means of either a foot pedal 29 or a hand lever 30 acting through a brake rod 31.

The clutch 25 is manually controlled by the driver by means of a foot pedal (not shown) positioned next to the brake pedal 29 and acting through elongate connecting rod and link mechanism 32, Figs. 1 and 3, of conventional type.

A gear shift lever 33, acting through link mechanism 34, enables the driver to shift the gears 23 from forward to reverse, and vice versa, at will.

The hopper structure 11 is divided into two forwardly disposed and relatively small compartments 35 and 36, Fig. 5, for dry chemical fertilizer and grass seed, respectively, and into a relatively large rearward compartment 37 for compost. The two forward compartments 35 and 36 open forwardly of the machine, for the introduction of the respective materials, and are closed in common by a hinged cover 38, while the rearward compartment 37 comprehends the greater part of the machine and has its top open, such opening being relatively broad in area, so that compost may be loaded expeditiously. It should be noted that the forward wall of the compost compartment 37 advantageously overhangs the fertilizer and seed compartments 35 and 36, so as to afford protection from the weather additional to that provided by the cover 38.

Each of the hoppers 35, 36, and 37 has a lower portion which converges to define an elongate discharge opening extending transversely of the machine. In the illustrated instance, the hoppers 35 and 36 have bottom walls 39 and 40, respectively, Fig. 5, which have respective forward lips of concavely arcuate formation, facing interiorly of the hopper, directly defining discharge openings 41 and 42, respectively. The hopper 37 has the lower margin of its rear wall bent forwardly, as at 37a, and the lower edge thereof similarly formed to directly define discharge opening 43.

The discharge openings 41 and 42 are further defined by stationary reaction portions of the respective distributor mechanisms described hereinafter.

In the illustrated embodiment of the invention, these reaction portions each comprise an elongate reaction plate 44 pivoted at 45 to the hopper, so as to be swingable toward and away from the interior of the hopper. Such reaction plate 44 is normally urged toward the interior of the hopper by means of a series of springs 46 encircling respective bolts 46—1 and bearing against an elongate bracket member 47 secured to the adjacent hopper wall.

The remainder of each distributor mechanism comprises a distributing cylinder 48 rotatably mounted longitudinally of and over the discharge opening—either 41 or 42 as the case may be—on oppositely extending stub shafts 48a Figs. 1 and 2, which are journaled in the walls of the hopper.

For the purpose of effecting a uniform and controlled distribution of grass seed or dry chemical fertilizer, the operating surfaces of both the cylinder 48 and the reaction plate 44 are covered with a pile material, indicated 49 and 50, respectively. As shown, such material is a pile fabric material of the nature of carpeting, specifically a twist-weave wool broadloom, though other pile materials may be employed, as will appear hereinafter.

Since the reaction plate 44 is normally urged inwardly by springs 46, the soft and flexible pile covering 50 thereof is forceably pressed into close engagement with the pile covering 49 of the distributing cylinder. Accordingly, rotation of the distributing cylinder 48 with respect to the substantially stationary reaction plate 44—in a counter-clockwise direction as indicated by the appended arrows in Fig. 5—effects a brushing action of the material to be distributed, along the individual piles of the stationary covering 50, which results in uniform and controlled distribution of either the finely divided dry chemical fertilizer or of the small and elongate grass seeds, as well as the intermixed small and round clover seeds, from the hopper.

In the form illustrated, the curvature of the lower lips of the hopper bottoms 39 and 40 is concentric with the distributing cylinders, and the cylinders are positioned so that the pile coverings thereof wipe closely against the inner surfaces of the lips, thereby providing maximum closure areas for the non discharging sides of the respective discharge openings.

The discharge opening 43 of the compost hopper 37 is further defined by a resiliently urged reaction plate 51 similar to the plates 44 and similarly mounted. Such reaction plate 51 is, however, not provided with a pile covering, but with a relatively hard and smooth covering 52 for coaction with a fluted distributing cylinder 53 whose surface is preferably hard and smooth.

The resilient mountings for the reaction plates of all three distributor mechanisms not only insure close surface engagement with the respective distributing cylinders at all times, but permit passage of oversize foreign objects which might be inadvertently mixed with the material being distributed. In this connection, it is to be noted that the soft and flexible pile covering, itself, affords a certain amount of leeway for the discharge of oversize foreign objects, without interfering with controlled discharge of fertilizer or seed. Furthermore such pile material satisfactorily accommodates differences in sizes between individual seeds, particularly as between the grass and the clover seeds.

The several distributing cylinders, 48 and 53, are intergeared in appropriate drive relationships with each other and with the rear traction roller 21, see Fig. 2. Thus, a sprocket wheel 54 of suitable diameter, is fixed to the axle 55 of the traction-compaction roller 21, and is connected by a sprocket chain 56 with a sprocket wheel 57 of suitable relative diameter, fixed to a protruding stub shaft 53—1 of the compost distributing cylinder 53. A second sprocket wheel 58, fixed to the same stub shaft 53—1, is connected by a sprocket chain 59 with a sprocket wheel 60, fixed to a protruding stub shaft 48a of that distributing cylinder 48 which is associated with the seed-containing hopper 36, and a second sprocket wheel 61, fixed to said stub shaft 48a, is connected by a sprocket chain 62 with a sprocket wheel 63 fixed to a protruding stub shaft 48a of that distributing cylinder 48 which is associated with the fertilizer-containing hopper 35.

The relative diameters of the several sprocket wheels 54, 57, 58, 60, 61, and 63 determine the relative speeds at which the several distributing cylinders rotate with respect to the speed of rotation of traction-compaction roller 21. Quantitative distribution of the respective materials is therefore governed, as it should be, in accordance with the speed of travel of the machine across the area being planted. Different relative cylinder speeds for any given speed of travel of the machine may be obtained by replacing selected ones of the several sprocket wheels with others of different diameters.

For the purpose of insuring proper feed of the compost in hopper 37 to the distributing mechanism thereof, a rotatable agitator 64, Fig. 5, is provided, and is continuously operated during travel of the machine by means of a sprocket wheel and chain drive indicated generally 65 in Fig. 1. Such drive 65 takes its power from the fluted, compost-distributing cylinder 53.

In order to insure proper deposition of the respective materials being distributed, discharge chutes 66, 67, and 68 are defined below and in material-receiving communication with the discharge openings 41, 42 and 43, respectively, see Fig. 1. These chutes are advantageously provided by deflection plates or flaps 69, which depend articulatively from respective attachment, as by means of bolts 69—1, Fig. 5, to the hopper structure along preferably the entire lengths of the respective discharge openings 41, 42, and 43. The ultimate discharge openings for deposition of the respective materials on the ground are therefore disposed in close succession immediately above the surface of the ground. Accordingly, the dry chemical fertilizer, the seed, and the compost are deposited sequentially in respective layers 70, 71, and 72, Figs. 1 and 2, as the machine travels.

In the operation of the machine, the forward roller 13 prepares a smoothly compact bed of soil for the deposition of the respective materials, while the rear traction-compaction roller 21 serves to smoothly compact the applied layers. No raking or other treatment of the so-planted lawn is necessary nor desirable.

I prefer to make the deflection plates or flaps 69 of stiffly flexible and resilient material, such as appropriate lengths of a heavy, industrial rubber, conveyor belting, so that they will give and return to position by the inherently articulative nature of the material if they hit any obstruction. Nevertheless, they may be plates of metal or other rigid material pivotally suspended in the desired positions.

While I have had excellent results using a wool, twist-weave, broadloom carpeting material, having a pile approximately one-quarter to three-quarters of an inch in length, as the pile covering for both the cylinder and reaction plate of the fertilizer and seed distributor mechanisms, various other kinds of pile material may be employed with varying degrees of satisfaction in specific instances of use, so long as such material provides a soft and yielding mat of upstanding, closely set, flexible fingers. The machine will ordinarily include all three hoppers, as illustrated, but, in some instances, the compost may be spread independently. In such instances, only hoppers and distributor mechanism for fertilizer and seed need be provided. Furthermore, if desired at anytime, the drive mechanism may be so arranged that seed can be distributed from the forward hopper, and fertilizer from the hopper next in line.

It is contemplated that the machine of the invention will find its greatest usefulness as a motorized unit, as illustrated, or as a trailer for pulling by a tractor. Nevertheless, the principles thereof are also applicable, as is obvious, to manually pushed or pulled machines.

In all forms of the machine, it is highly advantageous to provide a manually controlled clutch in the drive mechanism connecting the traction roller with the distributor mechanism. This may be accomplished by the use of any suitable conventional clutch, for example, that shown schematically at 74, Figs. 2 and 3, as interposed between the axle 55 of the rear compaction roller 21 and the main drive sprocket 54, the same being controlled by a lever 75, Fig. 1, convenient to the driver's seat.

Whereas this invention is here illustrated and described with respect to a particular preferred embodiment thereof it should be understood that various changes may be made therein and various other forms of the invention may be constructed on the basis of the teachings hereof, by those skilled in the art, without departing from the scope of the claim which follows.

What is claimed is:

In a machine for planting lawn having a series of supply hoppers extending from front to rear of the machine; traction means mounting said series of hoppers for travel over the ground; elongate discharge openings formed at the bottoms of the respective hoppers transversely of the machine, said discharge openings individually communicating with the interiors of the respective hoppers; material distributor mechanisms operably disposed within and along the discharge openings of respective hoppers; drive means for the respective distributor mechanisms, said drive means being intergeared with the said traction means; the improvement comprising a series of individual, mutually spaced, freely hanging, stiff, and normally shape-retaining wall members of rubber material secured to and extending substantially coextensively and yieldably along lower portions of the respective hoppers, longitudinally marginal to the discharge openings thereof, and defining, with respect to said machine, a longitudinal series of transversely extending, independently yieldable chute extensions for said hoppers, said wall members terminating short of the ground level of said traction means.

References Cited in the file of this patent

UNITED STATES PATENTS

| | | |
|---|---|---|
| 112,006 | Aitchison | Feb. 21, 1871 |
| 151,674 | Wilkinson | June 2, 1874 |
| 370,206 | Montgomery | Sept. 20, 1887 |
| 544,470 | Thomas | Aug. 13, 1895 |
| 1,515,987 | Allison | Nov. 18, 1924 |
| 1,903,874 | Mills et al. | Apr. 18, 1933 |
| 2,369,983 | Rodli et al. | Feb. 20, 1945 |
| 2,733,838 | Neff | Feb. 7, 1956 |

FOREIGN PATENTS

| | | |
|---|---|---|
| 151,578 | Germany | June 4, 1904 |